United States Patent [19]

Archer

[11] Patent Number: 5,295,307
[45] Date of Patent: Mar. 22, 1994

[54] SENSING CIRCUIT FOR POSITION-SENSING PROBE

[75] Inventor: Clifford W. Archer, Dursley, United Kingdom

[73] Assignee: Renishaw Metrology Limited, Gloucestershire, United Kingdom

[21] Appl. No.: 915,138

[22] Filed: Jul. 20, 1992

[30] Foreign Application Priority Data

Jul. 27, 1991 [GB] United Kingdom ............... 9116245

[51] Int. Cl.$^5$ .............................................. G01B 7/18
[52] U.S. Cl. ......................................... 33/561; 33/558; 33/DIG. 13
[58] Field of Search ................ 33/556, 558, 559, 561, 33/502, 503, DIG. 13; 340/678, 686, 687

[56] References Cited

U.S. PATENT DOCUMENTS

| | | |
|---|---|---|
| 4,213,348 | 7/1980 | Reinertson et al. |
| 4,462,162 | 7/1984 | McMurtry ............... 33/561 |
| 4,622,751 | 11/1986 | Berg. |
| 4,637,263 | 1/1987 | Fritz et al. |
| 4,817,362 | 4/1989 | Archer. |
| 4,818,151 | 3/1989 | Hajdukiewicz et al. ........... 33/561 |

FOREIGN PATENT DOCUMENTS

| | | |
|---|---|---|
| 0175912 | 4/1986 | European Pat. Off. |
| 3933575 | 4/1991 | Fed. Rep. of Germany. |
| 2135461 | 12/1972 | France. |
| 2298084 | 8/1976 | France. |
| 8504005 | 9/1985 | World Int. Prop. O. ........... 33/561 |

OTHER PUBLICATIONS

Database WPIL, Week 8032, Derwent Publications Ltd., London, GB; AN 80-G9597C (Medasonics Inc) Jul. 23, 1980.

Primary Examiner—William A. Cuchlinski, Jr.
Assistant Examiner—Alvin Wirthlin
Attorney, Agent, or Firm—Oliff & Berridge

[57] ABSTRACT

A touch trigger probe for machine tools or coordinate measuring machines has three strain gauges SG1-3 which react to deflection of a stylus of the probe, causing a trigger signal to be generated in signal processing circuitry SP. To reduce power consumption, and thus to reduce thermal growth of the probe, the strain gauges are fed by constant current sources CS1-3. The sources CS1-3 are servo controlled from a reference resistance $R_{ref}$ and constant current source CS4, by an amplifier A4.

12 Claims, 1 Drawing Sheet

SENSING CIRCUIT FOR POSITION-SENSING PROBE

FIELD OF THE INVENTION

This invention relates to probes, e.g. trigger probes, such as used on coordinate measuring machines (CMMs) machine tools and other positioning machines for measuring the dimensions of workpieces. More particularly, it relates to sensing circuits for use in such probes.

DESCRIPTION OF PRIOR ART

It is becoming increasingly common to use strain or stress sensitive elements such as strain gauges or piezo sensors in such probes. These react to minute forces or strains which are caused when a deflectable stylus of the probe contacts a workpiece, during movement of the probe relative to the workpiece. When such forces or strains are detected, the probe generates a trigger signal. This trigger signal is used by the machine in which the probe is mounted to cause a reading to be taken of the instantaneous x,y,z coordinates of the position of the probe in the working volume of the machine.

U.S. Pat. No. 4,817,362 describes such a probe, in which three strain gauges are arranged at equal spacings around an axis of the probe. The strain gauges form part of a sensing circuit in which each strain gauge is connected in series with a fixed resistor in a voltage divider arrangement. When the stylus of the probe contacts a workpiece and causes strains in one or more of the strain gauges, corresponding voltage deviations in the voltage divider are picked up and amplified. A trigger signal is generated when the amplified signals pass through a threshold. In a commercial embodiment of the prior art probe described in that patent, a reference resistor was also provided, in series with another fixed resistor in a further voltage divider arrangement. This further voltage divider provided a reference voltage. The respective voltages in the dividers containing the strain gauges were each differentially amplified against this reference voltage, in order to pick up and amplify the voltage deviations caused by strain.

SUMMARY OF THE INVENTION

As probes become increasingly accurate, we have found it desirable to take account of the possibility that measurement errors may be introduced if the size of the probe increases as a result of thermal effects. If such thermal growth takes place, the rest position of the work-contacting tip of the stylus may change relative to the mounting of the probe on the machine. If this happens, a corresponding error is introduced into subsequent measurements, unless the probe is re-calibrated. We have found that such thermal growth can be caused as a result of power dissipation in the sensing circuit housed within the probe.

The present invention provides a position-sensing probe for use on a positioning machine, for producing a signal when brought into a sensing relationship with a workpiece, comprising at least one sensor the resistance of which changes upon attainment of the sensing relationship, a device for detecting variations in the resistance, and characterized by a constant current source for supplying a constant current through the sensor.

In preferred forms of the invention, there may be more than one sensor, each with its own constant current source. There may be a reference resistance, and the device for detecting resistance variations may be a differential amplifier having one input connected to receive the voltage variations across the sensor and a second input connected to receive voltage variations across the reference resistance. The reference resistance may also have its own constant current source. The constant current source or sources for each sensor may be controlled so as to mirror the operation of the constant current source for the reference resistance. The sensing relationship with the workpiece will usually involve contact with the workpiece, though sensors which sense proximity to the workpiece without contact are not excluded.

The preferred embodiments, at least, of the present invention enable the power dissipation of the sensing circuit, for a given sensitivity, to be reduced. Alternatively, if reducing the power dissipation is not a problem in a particular case, the sensitivity can be increased for no corresponding increase in power consumption.

BRIEF DESCRIPTION OF THE DRAWING

A preferred embodiment of the invention will now be described with reference to the accompanying drawing, in which.

DESCRIPTION OF PREFERRED EMBODIMENT

Figure 1:
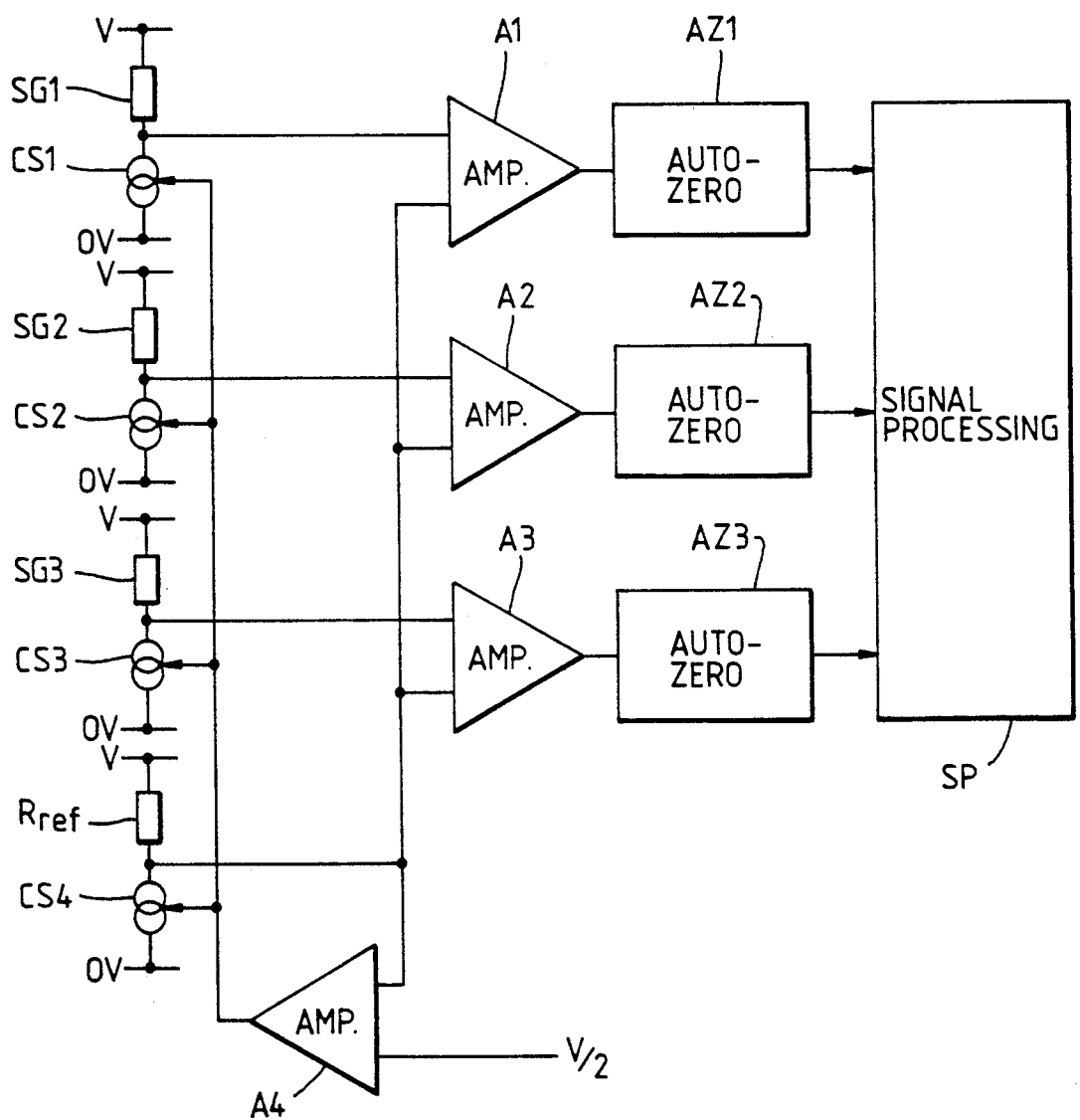
FIG. 1 is a schematic circuit diagram of a sensing circuit for a touch trigger probe.

The touch trigger probe is of the type described in U.S. Pat. No. 4,817,362, to which reference should be made for further details. As described in that patent, it contains three sensors in the form of semi-conductor strain gauges SG1,SG2,SG3, equispaced about the axis of the probe. These strain gauges react to deflections of a stylus of the probe when it contacts a workpiece. In accordance with the invention, each strain gauge is in series with a respective constant current source CS1,CS2,CS3 between a power supply rail V and a zero volts earth return rail 0V. The constant current sources replace the fixed resistors described in U.S. Pat. No. 4,817,362 in series with each strain gauge.

The voltage developed across each strain gauge SG1-3 is monitored and any variations amplified by respective amplifiers A1,A2,A3. These amplifiers are differential amplifiers, the other inputs of which monitor voltage changes across a reference resistance $R_{ref}$. The reference resistance $R_{ref}$ has the same resistance as the nominal, unstrained resistance of each strain gauge. It may itself be a further, similar strain gauge, mounted within the probe in a position such that it does not suffer any strain. Desirably, it is so mounted on a part of the probe which is close to the parts upon which the gauges SG1-3 are mounted, and which has a similar thermal inertia. These measures help to ensure that the reference resistance tracks any drifting of the strain gauges SG1-3 due to ambient temperature changes. The reference resistance $R_{ref}$ is in series with a further constant current source CS4 between the supply rail V and the zero rail 0V. The differential amplifiers A1-A3 therefore only amplify changes in the strain gauge voltages relative to the voltage across the reference resistance. The use of a reference resistance for this purpose (though not another strain gauge, and not with a constant current source) is known from commercial embodiments of the probe of U.S. Pat. No. 4,817,362.

The output of each amplifier A1-3 is fed to a respective auto-zeroing circuit AZ1,AZ2,AZ3. These ensure that the circuit is insensitive to drift caused by thermal effects, and are described in more detail in U.S. Pat. No. 4,817,362. The outputs of these auto-zeroing circuits are fed to further signal processing circuits SP, which produce the desired trigger signal in the same manner as described in U.S. Pat. No. 4,817,362, or in the manner described in our copending patent application Ser. No. 07/907,128 which claims priority from U.K. Patent Applications Nos. 9114353.7 and 9114371.9. If desired, alternative signal processing could provide an analog output indicative of the amount of stylus deflection. The constant current sources CS1-4 may be constructed in a conventional manner. For example, they may each comprise a transistor, the emitter of which is connected to OV and the base and collector of which are connected to the corresponding strain gauge. However, rather than a simple constant current source of this nature, we prefer to use a controlled constant current source. The constant current supplied by each of the sources CS1-4 is controlled by the output of a differential amplifier A4. One input of this amplifier receives a reference voltage V/2, i.e. half the supply voltage V. The other input is connected to the junction between the reference resistance $R_{ref}$ and its constant current source CS4, so as to monitor variations of the voltage across $R_{ref}$ in parallel with the amplifiers A1-3. Thus, the amplifier A4 acts as an error amplifier for correcting any voltage variation across the reference resistance $R_{ref}$, thereby maintaining the constant current supplied to it through the source CS4. The constant currents supplied by the sources CS1-3 mirror this constant current, being controlled in parallel with it.

Desirably, each of the constant current sources CS1-4 are provided on the same semiconductor chip, so that each is affected equally by any temperature changes. Each constant current source may comprise a single transistor of a transistor array integrated circuit such as that sold under the designation CA3046. However, our preference is that the four constant current sources should be integrated with other circuit elements, including the amplifiers A1-4 and the auto-zeroing circuits AZ1-3, on a custom-designed application specific integrated circuit (ASIC).

The following comparative example compares the power dissipation in one of the strain gauges and its constant current source, e.g. SG1 and CS1, with the power dissipation in the corresponding strain gauge and fixed resistor of U.S. Pat. No. 4,817,362. The example assumes that in each case the strain gauge has a nominal resistance, when unstrained, of 1kΩ, and that the fixed resistor in the circuit of U.S. Pat. No. 4,817,362 is also 1kΩ. In each case, the power dissipation is calculated for an arrangement in which the sensitivity (the variation in voltage across the strain gauge) is 2.5 mV for an increase in strain gauge resistance of 1Ω.

In the circuit according to U.S. Pat. No. 4,817,362, the above level of sensitivity can be achieved with a supply voltage of 10V. The combined resistance of the strain gauge and the fixed resistor is 2kΩ, and consequently the quiescent current is 5mA. If the resistance of the strain gauge changes from 1kΩ to 1.001kΩ as a result of strain, the total resistance is now 2.001kΩ, the current is 4.9975mA, and the voltage drop across the strain gauge increases from 5V to 4.9975×1.001=5.0025V. Thus, the increase in voltage is 2.5mV. The power dissipation is 10V×5mA=50mW.

With the circuit of the embodiment of the present invention just described, the same 2.5mV sensitivity can be achieved with a supply voltage of 5V. The constant current supplied by the constant current source is set at 2.5mA. The voltage drop across the strain gauge SG1 is 2.5mA×1kΩ=2.5V. If the resistance of the strain gauge increases by 1Ω, the new voltage drop across the strain gauge is 2.5mA×1.001kΩ=2.5025V. Thus, the increase in voltage is 2.5mV, namely the same sensitivity as previously. However, the power dissipation is now 5V×2.5mA=12.5mW. In this comparative example, therefore, there is a four-fold reduction in the power dissipation, for the same sensitivity. The same reduction in power dissipation can be achieved in the circuits of the other two strain gauges SG2,SG3 and of the reference resistance $R_{ref}$.

If desired, the circuit could be designed so as to give improved sensitivity without necessarily increasing the power consumption, e.g. by increasing the supply voltage to 10V and the constant current to 5mA. With these values, the power consumption is the same as in the fixed resistor example of U.S. Pat. No. 4,817,362, but the sensitivity is doubled.

I claim:

1. An apparatus for use on a positioning machine, comprising a position-sensing probe having a stylus for contacting a workpiece and sensing means for producing a signal when the stylus is brought into contact with the workpiece, the sensing means being mounted in the position-sensing probe and comprising at least one sensor with a resistance that changes upon attainment of the contact, mans for detecting variations in the resistance, and a constant current source for supplying a constant current through the sensor, the current remaining constant though the sensor despite changes in sensor resistance upon attainment of contact with the workpiece.

2. An apparatus according to claim 1, comprising a plurality of sensors, the resistance of which changes upon attainment of the contact, and a plurality of constant current sources, each supplying a constant current through a respective one of the sensors.

3. An apparatus according to claim 1, including means for controlling the constant current source for the sensor in accordance with a reference signal.

4. An apparatus according to claim 3, comprising a further sensor, mounted such that its resistance does not change upon attainment of the contact, the controlling means being connected to receive the reference signal from the further sensor.

5. An apparatus according to claim 1, comprising a reference resistance, and wherein the means for detecting resistance variations comprises a differential amplifier having one input connected to receive voltage variations across the sensor and a second input connected to receive voltage variations across the reference resistance.

6. An apparatus according to claim 5, wherein the reference resistance comprises a further sensor, mounted such that its resistance does not change upon attainment of the contact.

7. An apparatus according to claim 5, comprising a further constant current source for supplying a constant current to the reference resistance.

8. An apparatus according to claim 7, including means for controlling the constant current source for the sensor so as to mirror the operation of the constant current source for the reference resistance.

9. An apparatus according to claim 1, wherein said sensor comprises a strain gauge.

10. An apparatus according to claim 1, further comprising; a reference element such that the means for detecting variations in the sensor resistance acts differentially with a resistance of the reference element, wherein the reference element comprises a further sensor mounted such that its resistance does not change upon attainment of the contact.

11. An apparatus according to claim 10, wherein said sensors comprise strain gauges.

12. A position-sensing probe for use on a positioning machine, for producing a signal when brought into a sensing relationship with a workpiece, comprising:
   at least one sensor the resistance of which changes upon attainment of said sensing relationship;
   means for detecting variations in said resistance;
   a first constant current source for supplying a constant current through the sensor;
   a reference resistance, wherein the means for detecting resistance variations comprises a differential amplifier having one input connected to receive voltage variations across the sensor and a second input connected to receive voltage variations across the reference resistance;
   a second constant current source for supplying a constant current to the reference resistance; and
   means for controlling the first constant current source for the sensor so as to mirror the operation of the second constant current source for the reference resistance.

* * * * *